UNITED STATES PATENT OFFICE.

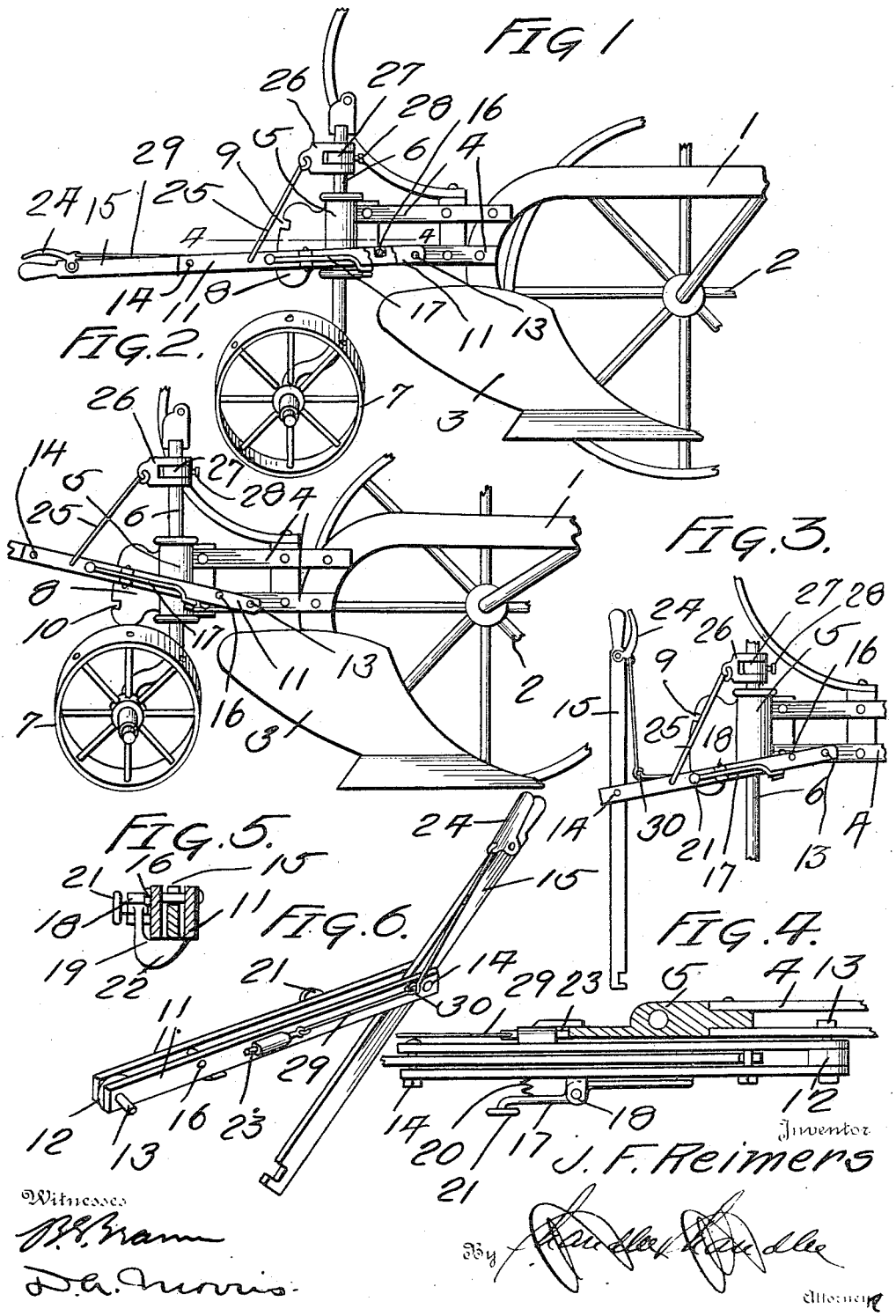

JOHN F. REIMERS, OF MILLARD, NEBRASKA.

LEVER MECHANISM FOR SULKY-PLOWS.

1,266,317.     Specification of Letters Patent.     Patented May 14, 1918.

Application filed April 5, 1915. Serial No. 19,289.

*To all whom it may concern:*

Be it known that I, JOHN F. REIMERS, a citizen of United States, residing at Millard, in the county of Douglas, State of Nebraska, have invented certain new and useful Improvements in Lever Mechanism for Sulky-Plows; and I do hereby declare the following to be a full, clear, and exact description of the invention, such as will enable others skilled in the art to which it appertains to make and use the same.

This invention relates to an attachment for sulky plows.

An object of the invention resides in the provision of an attachment by means of which the plow may be lifted from the ground.

A further object of the invention resides in so constructing the device that it may be conveniently folded for storing.

With these and other objects in view, such as will appear as the description progresses, my invention comprises the combination and arrangement of parts as set forth in and falling within the scope of the appended claim.

Referring to the drawing:

Figure 1 is a side elevation of my device, with parts broken away, attached to a sulky plow, the parts being in the positions they will occupy when the plow is raised from the ground.

Fig. 2 is a similar view showing the parts in the positions they will occupy when the plow is lowered.

Fig. 3 is a side elevation, showing the parts folded.

Fig. 4 is a horizontal sectional view on line 4—4 of Fig. 1.

Fig. 5 is a vertical sectional view showing the catch for maintaining the two portions of the lever together.

Fig. 6 is a perspective view of the lever.

Referring to the drawing wherein like parts are indicated by like characters throughout the several views:—

In the drawing I have illustrated a portion of a sulky plow so as to show the coöperation of my device therewith. This plow includes a beam 1 supported by wheels 2, which beam has a plow 3 on the lower end thereof. Secured to the beam 1 and extending outwardly, rearwardly therefrom are brace members 4 on the rear ends of which a bearing member 5 is secured, in which the rear axle 6 having the wheel 7 thereon is vertically slidable.

In order that the plow 3 may be raised or lowered, I have provided the bearing member 5 with an outwardly projecting portion 8, the rear edge of which is of arcuate formation and has notches 9 and 10 therein, adjacent the upper and lower ends thereof, respectively. Pivotally mounted on one of the lower brace members 4 is a lever which comprises a pair of spaced bars 11 which are held in spaced relation by a washer 12 and which bars are pivoted to the brace member 4 by a bolt 13. Pivotally mounted on the bolt 14 between the rear ends of these bars 11 is a second section 15 of the aforementioned lever, the bars 11 forming the first section. The inner end of this section 15 projects between the bars 11 and its movement in one direction is limited by a bolt 16 which extends transversely between the bars 11. In order that these sections of the lever may be held in alinement with each other, I have provided a catch 17 which is pivoted to an ear 18 on the outermost bar 11 and has a finger 19 extending beneath the bars 11 and across the same. This finger is maintained in this position, normally, by means of a spring 20, but may be moved outwardly by means of a handle 21 formed on the catch 17. This finger 19 is provided with a cam surface 22 against which the section 15 of the lever will strike when the section is being moved into alinement with the other section of the lever so that the finger will be moved out of the path of movement of the lever section 15. This finger will be returned, however, to its normal position after the lever section 15 has passed by the spring 20 so that the sections of the lever will be secured in alinement.

Mounted on this lever is a spring pressed pawl 23 which is operated by the usual handle 24 and is adapted to engage either of the notches 9 or 10. Pivotally secured to this lever is a link 25 which extends upwardly and is, at its other end, connected, pivotally, to a casting 26 which is loosely mounted on the axle 6, but is prevented from sliding movement thereon by a collar 27 which is secured to the axle by means of a set screw 28. The operating rod 29 which extends between the pawl 23 and the handle 24 is jointed between its ends, as at 30, for a purpose which will later appear.

Referring to Fig. 1 of the drawing, the plow is raised from the ground and the pawl 23 extends into the notch 10 in the projection 8 so that the axle 6 is held in such position that it will extend downwardly a considerable distance from the bearing member 5 and the plow will be in such position that the vehicle may be drawn across the ground or from one field to the other without the plow penetrating the ground. When it is desired to lower the plow so that it will operate upon the ground it is only necessary to disengage the pawl 23 from the notch 10 and to move the lever about its pivot until the pawl engages in the notch 9, at which time the axle 6 will extend upwardly from the bearing 5 and the plow will be in such position that it will penetrate the ground upon the forward movement of the vehicle.

When it is desired to fold the device so that it will occupy the minimum space for storing the handle 21 of the catch 17 is pushed inwardly against the tension of the spring 20. This will move the finger 19 out of the path of movement of the section 15 of the lever so that the section may be swung to the position shown in Fig. 3 of the drawing. At this time the pawl 23 will be engaged in the notch 10 and the sections of the rod 29 will extend at right angles to each other. When the parts are in this position the plow may be conveniently stored.

By providing the above described attachment the plow may be raised or lowered very readily and the operation may be accomplished without any great effort owing to the particular arrangement of the parts of the device.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

An operating lever for sulky plows, comprising a pair of spaced plates, a bar pivoted between the plates at an intermediate point of the former, a bolt extending between the plates, the said bar having a notch in one end thereof adapted to engage the bolt, a catch extending between the plates and having a cam face, the catch being in the path of movement of the bar so that upon the bar being swung into alinement with the plates, it will ride upon the cam face of the catch so as to move the same laterally and means for returning the catch to its initial position to lock the bar in alinement with the plates.

In testimony whereof, I affix my signature, in the presence of two witnesses.

JOHN F. REIMERS.

Witnesses:
 JOHN H. SIERT,
 CLAIR WHEELER.

Copies of this patent may be obtained for five cents each, by addressing the "Commissioner of Patents, Washington, D. C."